US012590660B1

(12) United States Patent
Jent et al.

(10) Patent No.: US 12,590,660 B1
(45) Date of Patent: Mar. 31, 2026

(54) REDUCED ASSEMBLY FORCE RESTRAINING GASKET

(71) Applicant: McWane, LLC, Birmingham, AL (US)

(72) Inventors: Jeffery J. Jent, Townley, AL (US); Daniel A. Copeland, Birmingham, AL (US)

(73) Assignee: MCWANE, LLC, Birmingham, AL (US)

( * ) Notice: Subject to any disclaimer, the term of this patent is extended or adjusted under 35 U.S.C. 154(b) by 0 days.

(21) Appl. No.: 18/786,107

(22) Filed: Jul. 26, 2024

(51) Int. Cl.
*F16L 37/092* (2006.01)

(52) U.S. Cl.
CPC ................................. *F16L 37/0925* (2013.01)

(58) Field of Classification Search
CPC . F16L 37/0925; F16L 37/0842; F16L 37/091; F16L 37/092; F16L 21/03; F16L 21/08
See application file for complete search history.

(56) References Cited

U.S. PATENT DOCUMENTS

| | | | | | |
|---|---|---|---|---|---|
| 5,067,751 | A | * | 11/1991 | Walworth | F16L 21/03 |
| | | | | | 285/374 |
| 9,400,071 | B1 | * | 7/2016 | Copeland | F16L 21/03 |
| 11,054,070 | B1 | * | 7/2021 | Key | F16L 21/03 |
| 2002/0106923 | A1 | * | 8/2002 | Copeland | F16L 21/03 |
| | | | | | 439/192 |

| | | | | | |
|---|---|---|---|---|---|
| 2009/0060635 | A1 | * | 3/2009 | Jones | F16L 37/0925 |
| | | | | | 403/14 |
| 2010/0078937 | A1 | * | 4/2010 | Jones | F16L 37/0925 |
| | | | | | 285/345 |
| 2012/0280497 | A1 | * | 11/2012 | Holmes, IV | F16L 37/0925 |
| | | | | | 285/379 |
| 2013/0229010 | A1 | * | 9/2013 | Percebois | F16L 21/03 |
| | | | | | 285/81 |
| 2015/0152990 | A1 | * | 6/2015 | Lopez-Chaves | F16L 37/0925 |
| | | | | | 277/609 |
| 2017/0114933 | A1 | * | 4/2017 | Copeland | F16L 21/03 |
| 2017/0184229 | A1 | * | 6/2017 | DeBoalt | F16L 21/03 |
| 2017/0328503 | A1 | * | 11/2017 | Copeland | F16L 21/03 |
| 2017/0370505 | A1 | * | 12/2017 | Copeland | F16L 21/08 |
| 2019/0162342 | A1 | * | 5/2019 | Copeland | F16L 21/08 |
| 2020/0041048 | A1 | * | 2/2020 | Jones | F16L 37/0925 |
| 2022/0221090 | A1 | * | 7/2022 | Pacheco | F16L 21/03 |

* cited by examiner

*Primary Examiner* — David Bochna
(74) *Attorney, Agent, or Firm* — C. Brandon Browning; Maynard Nexsen PC

(57) ABSTRACT

A gasket, a spigot, a bell and method of using same for reducing the force required to assemble a pipe or fitting joint, the method including isolating the act of progressively increasing compression of a heel portion of the gasket from the act of progressively increasing compression of a sealing portion of the gasket as the spigot advances into the bell and a seal is formed between the gasket and the spigot and bell. To isolate progressively increasing compression of the heel portion from progressively compressing the sealing portion, peak compression of the heel portion between the spigot and the bell is experienced by the heel portion prior to any material compression of the sealing portion of the gasket between the spigot and the bell occurring.

17 Claims, 9 Drawing Sheets

REDUCED ASSEMBLY FORCE RESTRAINING GASKET

FIELD OF THE INVENTION

The present invention is directed to a pipe or fitting joint gasket and more particularly to a pipe or fitting joint gasket including an arrangement of metal segments wherein the gasket and segments are configured for decreasing spigot insertion force during pipe joint formation.

BACKGROUND OF THE INVENTION

Pipe joint gaskets including anti-slip segments for preventing the separation of interconnected, telescoping pipes in applications where a fluid such as water for fire mains is held under high pressure are known in the art. Exemplary gaskets are described in U.S. Pat. Nos. 5,295,697 and 5,464,228 in which a rubber gasket, serving as a fluid seal, includes a heel portion containing toothed metal segments spaced uniformly around its inner perimeter. The toothed metal segments bite into the outer surface of the spigot of the inserted pipe and prevent withdrawal of the inserted pipe from a bell end of the other pipe. The metal segments pivot about a retainer bead in the bell end of the other pipe to allow the spigot end to be inserted into the bell end of the other pipe while preventing withdrawal of the inserted pipe under high fluid pressure conditions.

A shortcoming of such gaskets is that during assembly of a pipe joint containing a gasket, the maximum force required to insert the spigot of a first pipe into the bell of a second pipe and through the gasket, followed by fully-seating the spigot within the bell, can be relatively large. In certain instances, the assembly force requirement is so great that machinery such as a back hoe is required to push the spigot into the bell, or vice-versa.

The relatively high pipe joint assembly force requirement arises from the radial force needed to simultaneously compress the foot portion of a gasket and a sealing portion of the gasket between the spigot and the bell end during spigot insertion into the bell end. In particular, during insertion of the spigot into the bell and gasket, the toothed metal segments of the gasket initially contact a tapered or beveled end section of the spigot and slide along the tapered end section as the spigot continues to advance into the bell end and the gasket. As the toothed segments slide along the tapered end section, the diameter of the tapered end section contacting the toothed metal segment progressively increases causing the toothed segments to progressively increase compression of the heel portion of the gasket between the spigot and toothed metal segments, on the one hand, and an inner wall of the bell end, on the other hand. Compression of the heel portion is necessary for proper engagement of the toothed segments with the outer surface of the spigot during pressurization of the pipes.

Prior to the toothed metal segments reaching that section of the spigot having a constant diameter, the tapered end section contacts and begins to compress the sealing portion of the gasket. At this point, the axial force required to further advance the spigot into the bell end and the gasket must be greater than the sum of the radial forces required to simultaneously compress the heel and sealing portions, both of which progressively increase as the toothed segments and the sealing portion slide along the tapered end section of the spigot. A maximum axial insertion force is experienced at the moment the toothed segments contact an annular rim or edge of the spigot outer wall formed by the intersection of the tapered end section and that section of the spigot having a constant diameter or the maximum diameter of the spigot since the heel portion is then fully compressed and further insertion requires only enough axial force to overcome the radial force required for progressively increasing compression of the sealing portion as the sealing portion slides along the tapered end section and ultimately over and beyond the annular rim of the spigot.

SUMMARY OF THE INVENTION

The present invention is directed to a restrained pipe joint, a gasket containing a plurality of toothed locking segments, and a method of using the gasket for decreasing the amount of force required to insert a spigot end of a first pipe, such as PVC pipe, a ductile iron pipe or other metal or plastic pipe, into a bell end of a second pipe, such as a ductile iron pipe or other metal pipe, when assembling the restrained pipe joint. Decreasing the amount of insertion force for assembling the restrained pipe joint is accomplished by isolating the act of progressively increasing the compression of a heel portion of the gasket when inserting the spigot end into the bell end and sliding the teeth of the toothed locking segments along a tapered or beveled end section of the spigot end from the act of compressing and progressively increasing the compression of a sealing portion of the gasket as the spigot advances further into the bell end and slides across the sealing portion. To isolate the acts of progressively increasing compression of the heel portion from compressing and progressively increasing the compression of the sealing portion, peak compression of the heel portion between the spigot end and the locking segments, on the one hand, and an inner wall of the bell end, on the other hand, is experienced by the heel portion as the spigot end advances into the bell end prior to there being any material compression of the sealing portion of the gasket between the spigot and the inner wall of the bell end. Because the amount of radial force required to attain peak compression of the heel portion is greater than the amount of radial force required to attain peak compression of the sealing portion and peak compression of the heel portion is reached without any compression of the sealing portion between the spigot end and the inner wall of the bell end, the maximum or peak axial assembly forced required to fully assemble the restrained pipe joint is the amount of force needed to overcome the force required to reach peak compression of the heel portion only. In this way, the assembly force required to form the restrained joint of the present invention is reduced relative to the prior art restrained joints.

According to one aspect of the invention, there is provided a method of forming a sealed, restrained pipe joint. The method includes providing a first pipe having a spigot including a distal end, a first outer wall section having a first diameter that is essentially constant along the length thereof, a beveled second outer wall section extending to and between the distal end and the first outer wall section, and an annular rim formed by an intersection of the first outer wall section and the second outer wall section, which tapers inwardly as it extends away from the rim towards the distal end. A second pipe is provided having a bell end including a gasket receiving groove, a groove inner wall, and a gasket operatively positioned within the gasket receiving groove. The gasket includes a heel portion having a first hardness, a sealing portion having a second hardness that is less than the first hardness, and a plurality of rigid segments at least partially embedded in the heel portion, each of the rigid segments including a unitary tooth extending radially inward. The pipe joint is formed by inserting the spigot into the bell end and gasket, contacting each of the unitary teeth at a first location about the second outer wall section of the spigot, followed by, sliding the teeth along a length of the second outer wall section defined between the first location and the rim without compressing the sealing portion of the gasket between the spigot and the groove inner wall.

In one embodiment of the present invention, the radial compression force applied to the heel portion of the gasket progressively increases as the tooth slides along the length of the second outer wall section between the first location and the rim and reaches a maximum compression force when the tooth engages the rim. In another embodiment the maximum compression force is reached prior to any compression of the sealing portion between the spigot and the groove inner wall. In yet another embodiment of the present invention, the heel portion of the gasket includes an annular groove configured for receiving an annular bead formed by the groove inner wall, and the at least one rigid segment has a substantially L-shaped cross-section.

According to another aspect of the invention there is provided a method of assembling a sealed, restrained pipe joint. The method includes providing a first pipe having a spigot with a tapered end section, a second pipe having a bell end and a bell end inner wall, and a gasket contained within the bell end, the gasket having a heel portion, a sealing portion and a plurality of rigid segments at least partially embedded in the heel portion. At least one rigid segment of the plurality of rigid segments includes a single tooth extending radially inward. The spigot end is inserted into the bell end and through the gasket thereby progressively increasing compression of the heel portion of the gasket between the spigot end and the bell end inner wall as the single tooth slides along the tapered end section without compressing the sealing portion between the spigot end and the bell end inner wall, followed by, progressively increasing compression of the sealing portion of the gasket between the spigot end and the bell end inner wall as the sealing portion slides along the tapered end section without progressively increasing compression of the heel portion between the spigot end and the bell end inner wall.

In one embodiment, the step of progressively increasing compression of the sealing portion of the gasket between the spigot end and the bell end inner wall occurs after sliding of the tooth along a section of the spigot end that is not tapered. In another embodiment of the invention, compression of the heel portion of the gasket between the spigot end and the bell end inner wall is progressively increased to a peak heel portion compression prior to progressively increasing compression of the sealing portion of the gasket between the spigot end and the bell end inner wall. In yet another embodiment of the invention, the at least one rigid segment has a substantially L-shaped cross-section, the single tooth of the at least one rigid segment extends from an end surface thereof, and the gasket includes a first annular groove formed in the heel portion and configured for receiving an annular bead formed by the bell end inner wall, a second annular groove separating the heel portion from the sealing portion and defining in part a neck portion coupling the heel portion and the sealing portion and a third annular groove formed in the sealing portion.

According to another aspect of the invention, there is provided a restrained pipe joint including a first pipe having a spigot including a distal end, a first outer wall section, a second outer wall section extending to and between the distal end and the first outer wall section and having a first length, an annular rim formed by an intersection of the first outer wall section and the second outer wall section, wherein the second outer wall section tapers radially inwardly from the annular rim to the distal end at a taper angle. The joint further includes a second pipe having a bell end and a bell end inner wall and a gasket contained within the bell end. The gasket includes a first annular groove formed within a heel portion of the gasket, a plurality of rigid segments at least partially embedded in the heel portion, at least one rigid segment of the plurality of rigid segments including a tooth extending radially inward through an inner annular surface of the gasket, and a first distance extending along the inner annular surface and to and between the single tooth and the sealing portion. The at least one segment, the first length, the taper angle and the first distance are configured for progressively increasing compression of the heel portion of the gasket between the spigot and the bell end inner wall as the single tooth slides along the second outer wall section during insertion of the spigot into the bell end without compressing the sealing portion between the spigot and the bell end inner wall. The at least one segment, the first length, the taper angle and the first distance are further configured for progressively increasing compression of the sealing portion of the gasket between the spigot and the bell end inner wall as the sealing portion slides along the second outer wall section during insertion of the spigot into the bell end without progressively increasing compression of the heel portion between the spigot and the bell end inner wall.

According to one embodiment of the invention, the gasket includes a second annular groove formed between the heel portion and the sealing portion. In another embodiment of the invention, the second annular groove defines at least in part a neck portion of the gasket that couples the heel portion to the sealing portion. According to another aspect of the invention, the joint includes a seal formed by the compression of the sealing portion between the spigot and bell end inner wall in the absence of a seal formed by the compression of the heel portion between the spigot and bell end inner wall.

DETAILED DESCRIPTION OF THE INVENTION

Figure 1:
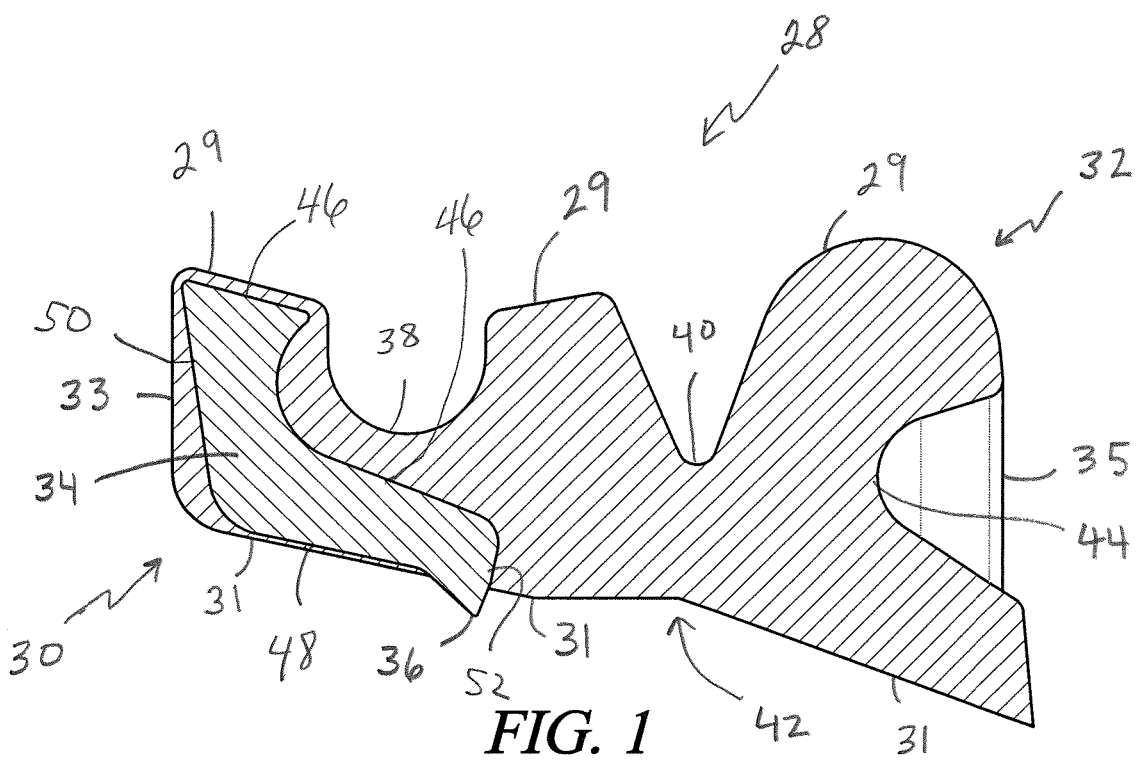
FIG. 1 is a sectional view of a gasket and a locking segment embedded therein in accordance with a first embodiment of the present invention.
Figures 2, 3, 4, 5:
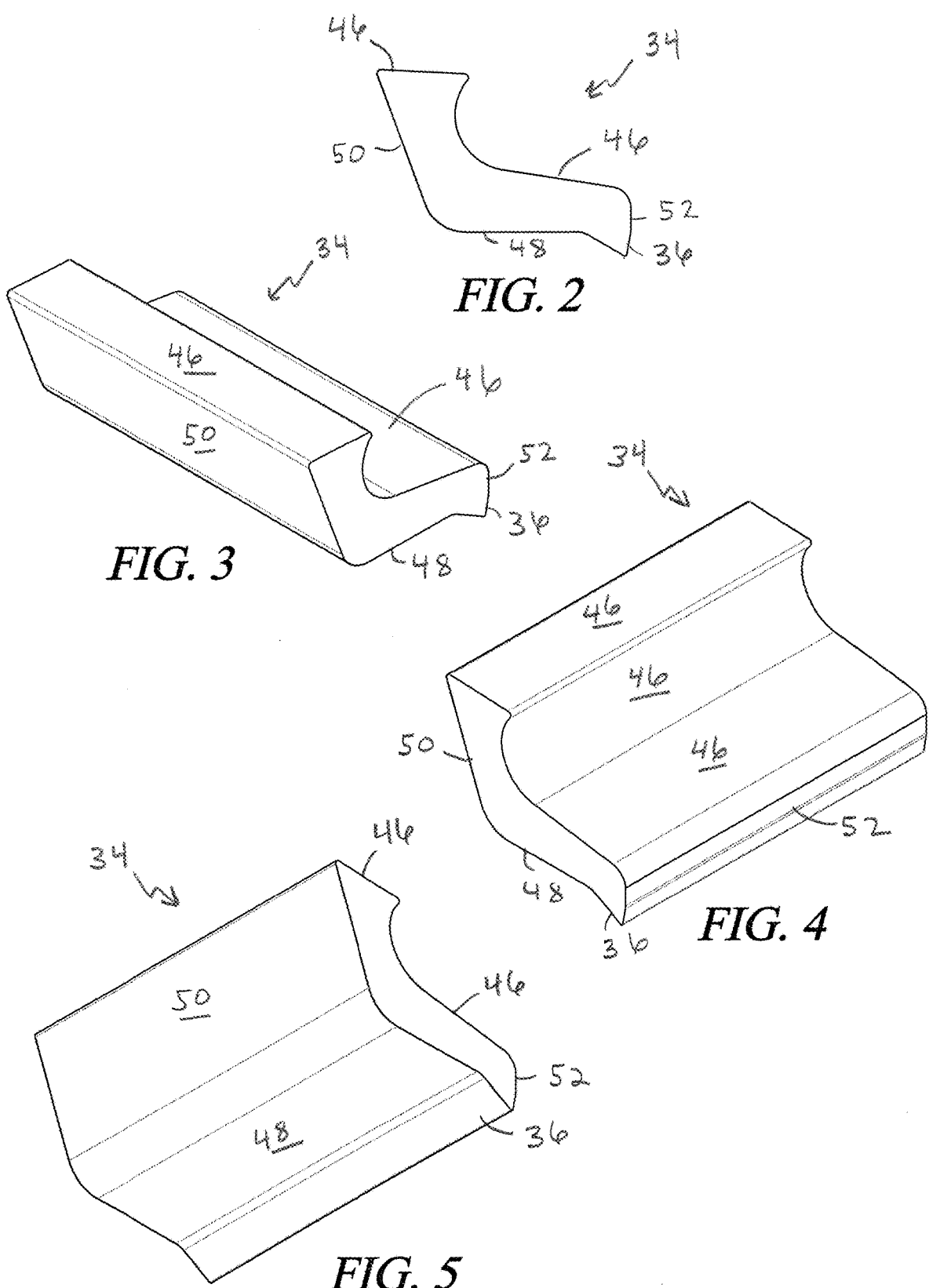
FIG. 2 is a sectional view of the locking segment of FIG. 1.
FIG. 3 is a perspective view of a proximal side of the locking segment of FIG. 1.
FIG. 4 is a perspective view a distal side of the locking segment of FIG. 1.
FIG. 5 is a perspective view of an inner side of the locking segment of FIG. 1.

The present invention is directed to a gasket configured for decreasing the amount of force required to insert a spigot end of a first pipe into a bell end of a second pipe and form a seal there between by isolating compression of a heel portion of the gasket from compression of a sealing portion of the gasket as the spigot end advances into the bell end and through the gasket. Referring generally to the drawings, FIG. 1 is a sectional view of a gasket 28 and a rigid segment 34 in accordance with a first embodiment of the present invention. FIGS. 2 through 5 depict various views of rigid segment 34. FIGS. 6 through 10 depict sectional views of a pipe joint 10 including a bell end 22 of a first pipe, which contains a gasket 280 in accordance with a second embodiment of the present invention with rigid segment 34 embedded therein, a spigot end 12 of a second pipe, and the arrangement of spigot end 12 relative to segment 34 and a sealing portion 32 of gasket 280 from initial insertion of spigot end 12 into the bell end 22 to complete assembly of a pipe joint 10 formed by the spigot and bell ends. FIGS. 11 through 15 depict various views of gasket 280.

Referring to FIGS. 1 through 5, gasket 28 is composed of an annular, elastomeric body defined between an outer gasket surface 29 and an inner gasket surface 31, on the one hand, and a proximal gasket surface 33 and a distal gasket surface 35, on the other hand. Outer gasket surface 29 extends distally from its intersection with proximal gasket surface 50 and includes therein a substantially U-shaped first annular groove 38 and distally thereto a substantially V-shaped second annular groove 40. An optional third annular groove 44 is formed within distal gasket surface 35. As explained in more detail hereafter, first annular groove 38 is provided for maintaining gasket 28 in position within bell end 22 during joint assembly and second annular groove 40, which defines neck portion 42 and divides gasket 28 into a heel portion 30 and sealing portion 32, is provided for allowing compression of heel portion 30 independently of compression of sealing portion 32 during joint assembly. Third-annular groove 44 is provided within sealing portion 32 for further reducing the force required to compress sealing portion 32 during joint assembly. In this regard, the third annular groove 44 can be configured to facilitate compression of the inner gasket surface 31 radially outward in response to the spigot end 12 of the pipe being fully inserted to the bell end 22. By including third annular groove 44, the resistance of the gasket to compression is reduced, thereby reducing the force required to compress sealing portion 32 during joint assembly.

Embedded and arranged circumferentially within heel portion 30 are rigid segments 34. Rigid segments 34 have a substantially L-shaped cross-section and may be fabricated from a metal, a metal alloy such as steel or any other suitable material capable being formed into a segment and effectively impinging upon spigot end 12. Each segment 34 is defined between an outer segment surface 46 and an inner segment surface 48, on the one hand, and a proximal segment surface 50 and a distal segment surface 52, on the other hand. Proximal segment surface 50 and outer segment surface 46 form a first arm of the L-shaped segment that extends within heel portion 30 between proximal gasket surface 33 and a proximal side of first annular groove 38 of gasket 28. Inner segment surface 48, outer segment surface 46 and distal segment surface 52 define a second arm of the L-shaped segment that extends between inner gasket surface 31 and first annular groove 38. An acutely pointed tooth 36 extends radially inward from inner segment surface 48 at its intersection with distal segment surface 52.

Figure 6:
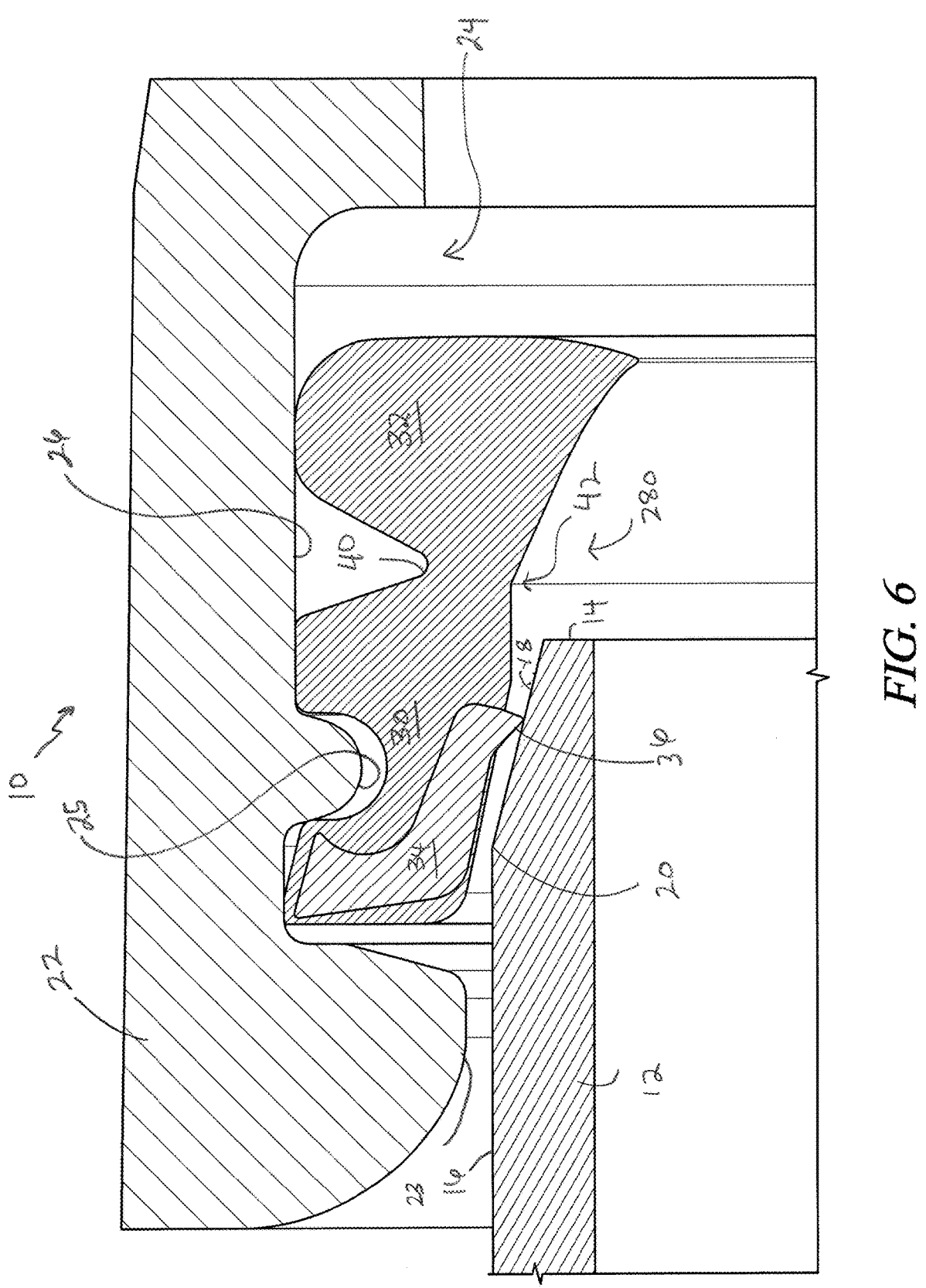
FIG. 6 is a sectional view of a bell end of a first pipe containing a gasket and a locking segment embedded therein in accordance with a second embodiment of the present invention and a spigot end of a second pipe entering the pipe bell.

Referring to FIG. 6, there is depicted a gasket 280 located within a gasket receiving groove 24 of bell end 22. As illustrated in FIGS. 11 through 15, gasket 280 is essentially identical to gasket 28 but for the absence of third annular groove 44. Gasket 280 shares like numbering with gasket 28. Gasket 280 is maintained in a desired position within gasket receiving groove 24 by an annular bead 25 protruding radially inward from a groove inner wall 26 and received within first annular groove 38 of gasket 280. As illustrated, gasket 280 forms a complete ring with its outer diameter approximating or slightly greater than the inner diameter gasket receiving groove 24, its inner diameter along heel portion 30 approximating or slightly greater than the outer diameter of spigot end 12, and its inner diameter along sealing portion 32 being less than the outer diameter of spigot end 12. Another diameter is defined by and between the apexes of teeth 36 of rigid segments 34 circumferentially arranged within gasket 280, the diameter being less than the outer diameter of spigot end 12. In operation, gasket 280 is intended to seal joint 10 by its compression of sealing portion 32 between spigot end 12 and bell end 22. Heel portion 30, which is not intended to form a seal between spigot end 12 and bell end 22, serves to anchor segments 34 within gasket 280 and engage annular bead 25. Given the differing functions of heel portion 30 and sealing portion 32, heel portion 30 exhibits a hardness that is greater than a hardness of sealing portion 32. Differing hardness within sealing portion 32 and heel portion 30 can be accomplished through a variety of methods, as would be understood by a person having relevant technical skill in the art. For example, sealing portion 32 and heel portion 30 can be comprised of the same material with the physical design of the device producing the variations in compressibility and resistance to joint assembly of the sealing portion 32 and the heel portion 30. In some embodiments, the sealing portion 32 and the heel portion 30 may comprise different materials having different hardness characteristics. In yet other embodiments, the sealing portion 32 and the heel portion 30 may comprise the same hardness.

Figure 7:
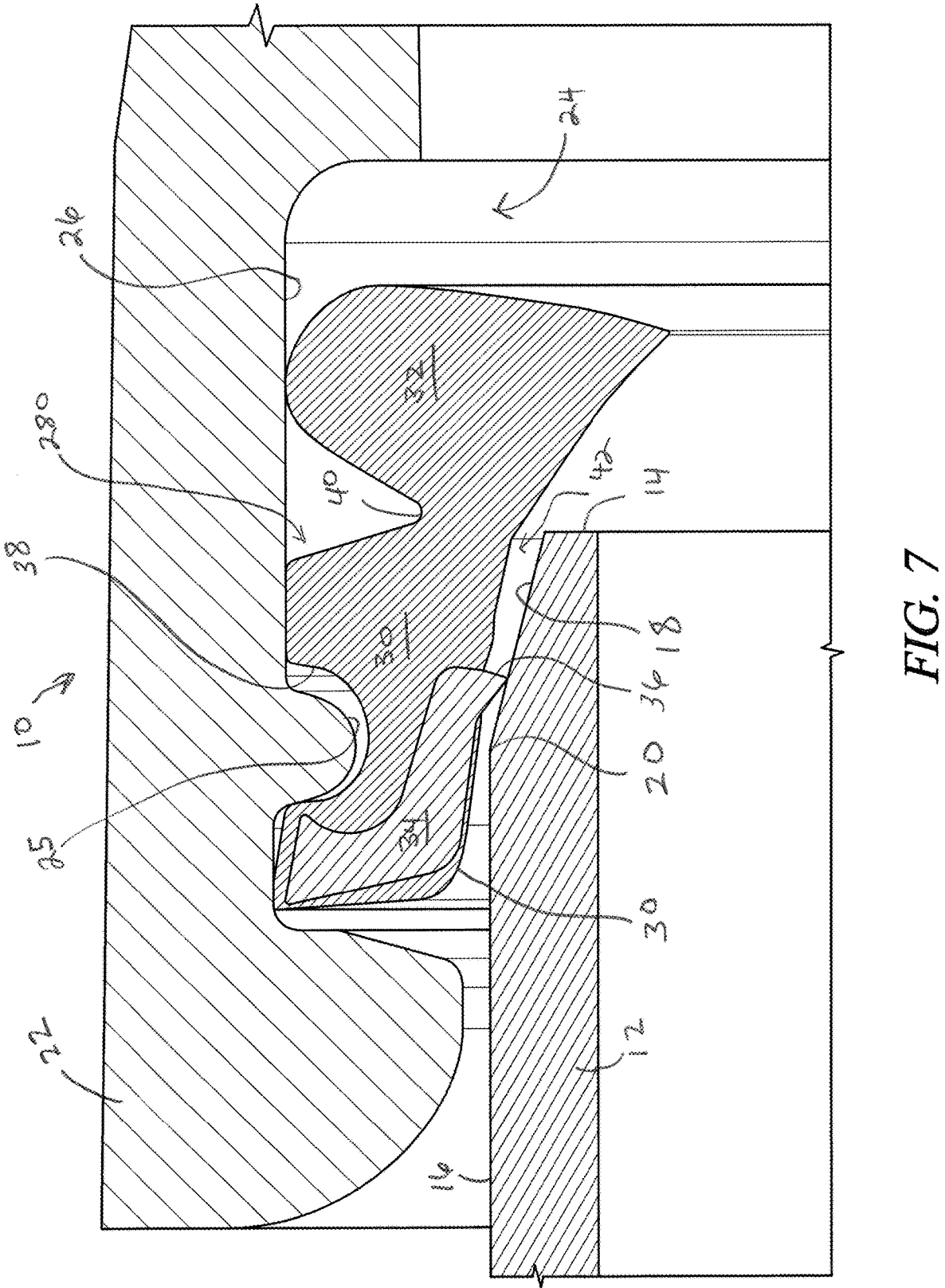
FIG. 7 is a sectional view of the bell end, the gasket and the spigot end of FIG. 6 illustrating initial contact of the locking segment with a beveled portion of the spigot end without engagement of the spigot end with a sealing portion of the gasket.

Referring to FIGS. 6 and 7, as pipe joint 10 is assembled, a throat 23 of bell end 22 guides spigot end 12 into the bell end until a beveled or tapered second outer wall section 18 of spigot end 12 contacts a tooth 36 of each of the segments 34 embedded in gasket 280. As spigot end 12 continues to slide through gasket 280, first annular groove 38 of gasket 280 engages with annular annual bead 25 of gasket receiving groove 24 thereby preventing the gasket from dislodging from receiving groove 24. Further, as the teeth 36 slide along second outer wall section 18, each of segments 34 is pressed radially outward as the diameter of spigot end 12 along second outer wall section 18 where engagement by teeth 36 progressively increases. As segments 34 are pressed radially outward, heel portion 30 of gasket 280 is compressed between segment 34 and gasket receiving groove 24 of bell end 22.

Figure 8:
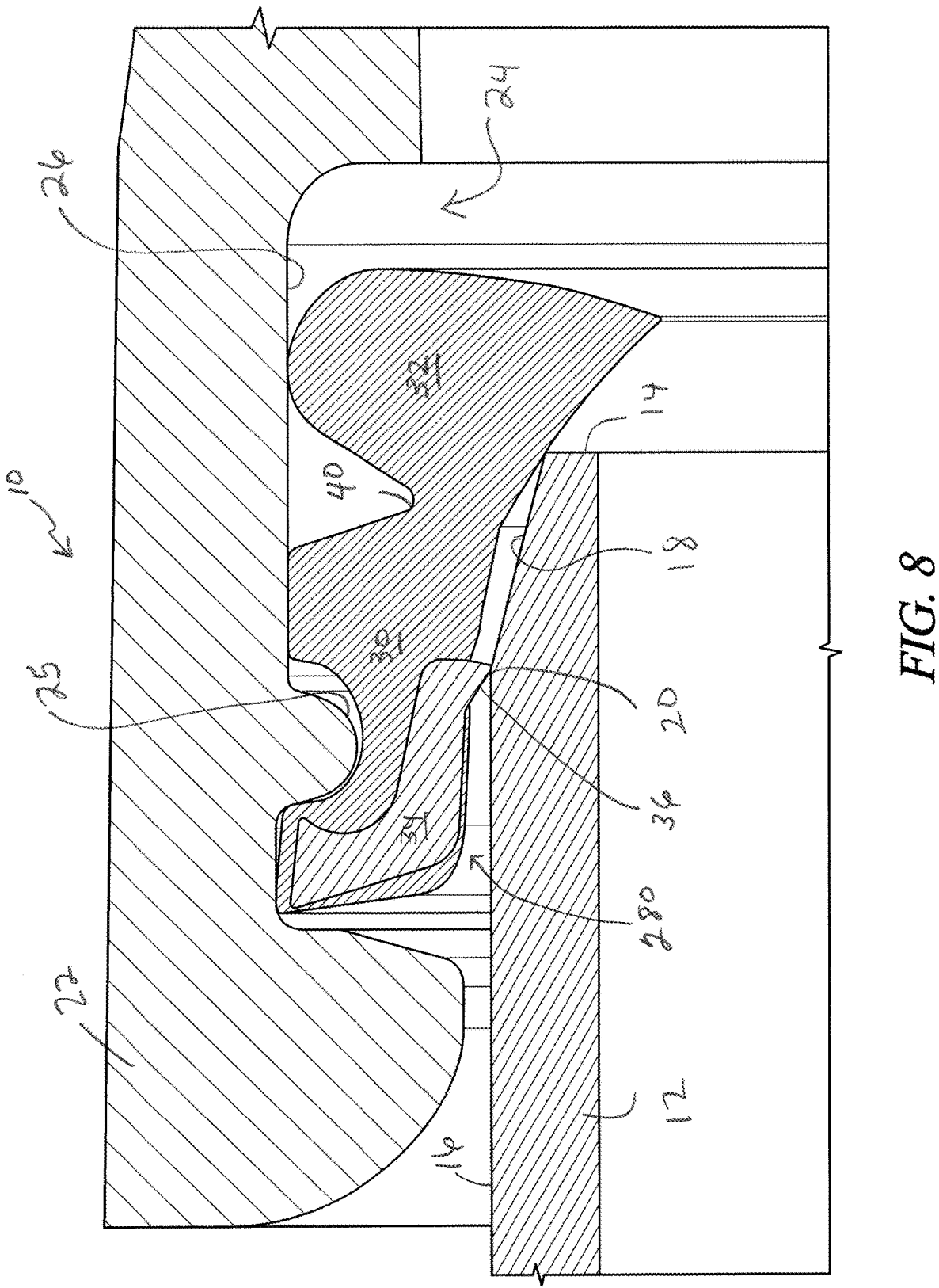
FIG. 8 is a sectional view of the bell end, the gasket and the spigot end of FIG. 7 illustrating peak joint assembly force and the arrangement of the spigot end relative to its engagement with the locking segment and the sealing portion of the gasket.

As the spigot end advances into the bell end, the axial force required to overcome the radial force required to press each of segments 34 radially outward and progressively increase compression of heel portion 30, also progressively increases. The amount of axial force required to overcome the radial force to sufficiently compress heel portion 30 reaches a peak as the apexes of the teeth 36 come into contact with the annular rim 20, which is defined by the intersection of tapered second outer wall section 18 and the constant diameter first outer wall section 16, which has a constant diameter greater than the diameter of second outer wall section 18. FIG. 8 illustrates the moment peak axial force is experienced to assemble pipe joint 10. In this configuration, the apexes of teeth 36 of rigid segments 34 come into contact with annular rim 20 while distal end 14 of spigot end 12 just touches inner gasket surface 31 of sealing portion 32. It should be understood that that sealing portion 32 remains uncompressed by any action of spigot end 12 while heal portion 30 reaches peak radial compression.

During the entirety of the engagement of teeth 36 with second outer wall section 18 (as illustrated in FIGS. 6-8), as each of segments 34 is pressed radially outward and heel portion 30 compressed, spigot end 12 remains separated from sealing portion 32 of gasket 280, and thus, sealing portion 32 remains uncompressed by any action of spigot end 12. This is accomplished by ensuring that the length of second outer wall section 18, which is defined between a distal end 14 of spigot end 12 and an annular rim 20, is such that the distal end 14 of spigot end 12 does not apply any radial compression to sealing portion 32 of gasket 280 until after heel 30 experiences peak radial compression as the apexes of teeth 36 come into contact with annular rim 20.

Figure 9:
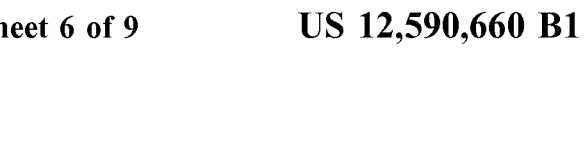
FIG. 9 is a sectional view of the bell end, the gasket and the spigot end of FIG. 8 illustrating sealing mechanism activation and the arrangement of the spigot end relative to its engagement with the locking segment and the sealing portion of the gasket.
Figure 10:
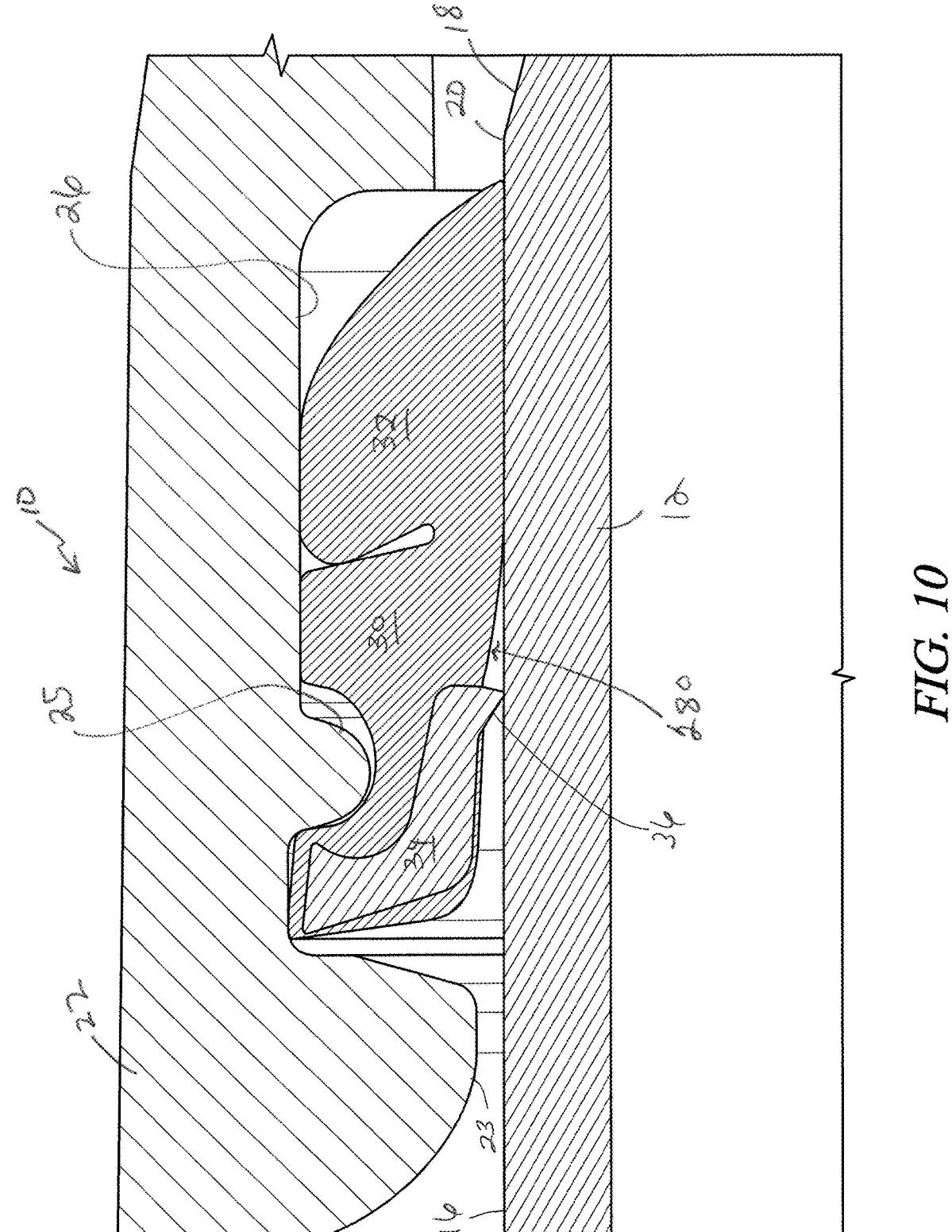
FIG. 10 is a sectional view of the bell end, the gasket and the spigot end of FIG. 9 illustrating the spigot end fully inserted to the bell end.

As the spigot end 12 continues to slide through gasket 280, as shown in FIG. 9, the axial force required to slide spigot end 12 is approximately equivalent to the radial compressive force required to compress sealing portion 32 between the spigot end 12 and the groove inner wall 26. As shown by FIG. 10, the spigot end 12 continues to slide through gasket 280 until the spigot end 12 is fully inserted to the bell end 22. In this configuration, sealing portion 32 comes into contact with groove inner wall 26 and creates a seal. As shown in FIG. 10, the second annular groove 40 may become compressed such that heel portion 30 and sealing portion 32 may contact one another while sealing portion 32 forms a tight seal against groove inner wall 26.

Figures 11, 12, 13:
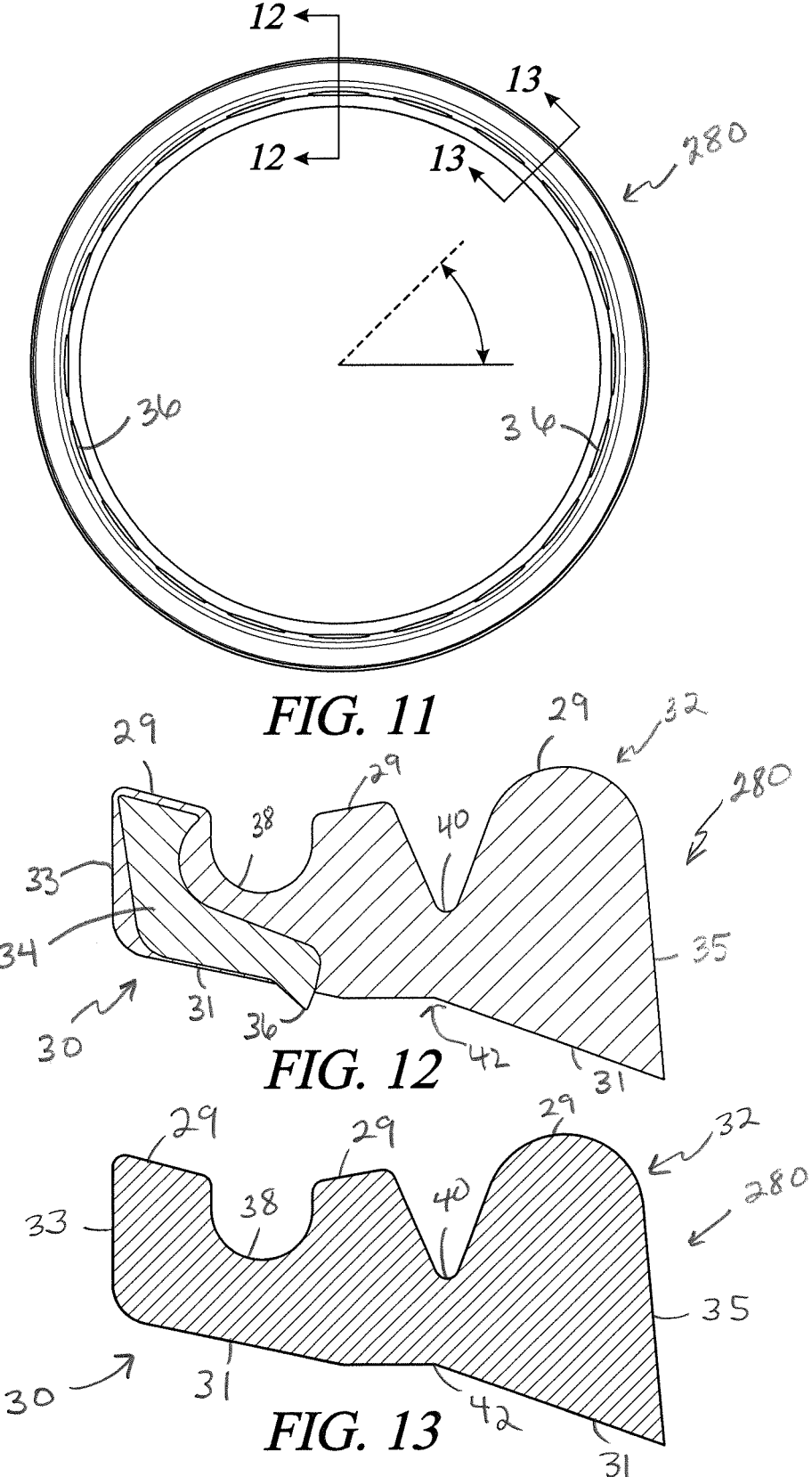
FIG. 11 is an elevational view of the gasket of FIG. 6 showing the placement of locking segments around its periphery.
FIG. 12 is a sectional view of the gasket of FIG. 11 along line 12-12.
FIG. 13 is a perspective view of the gasket of FIG. 11 along line 13-13.

As shown in FIG. 11, gasket 280 includes a plurality of teeth 36 extending radially inwards from rigid segments 34 around the periphery of gasket 280. FIGS. 12-13 show a sectional view of gasket 280 along lines 12-12 and 13-13, respectively. Line 12-12 is taken through a respective rigid segment 34, and therefore in FIG. 12, rigid segment can be seen extending between outer gasket surface 29 and inner gasket surface 31 and having an apex of a tooth 36 extending radially inwards from rigid segment 34. In contrast, line 13-13 is taken between respective rigid segments 34 that line the periphery of gasket 280, and accordingly, gasket 280 can be seen without the presence of a respective rigid segment 34 in FIG. 13.

Figure 14:
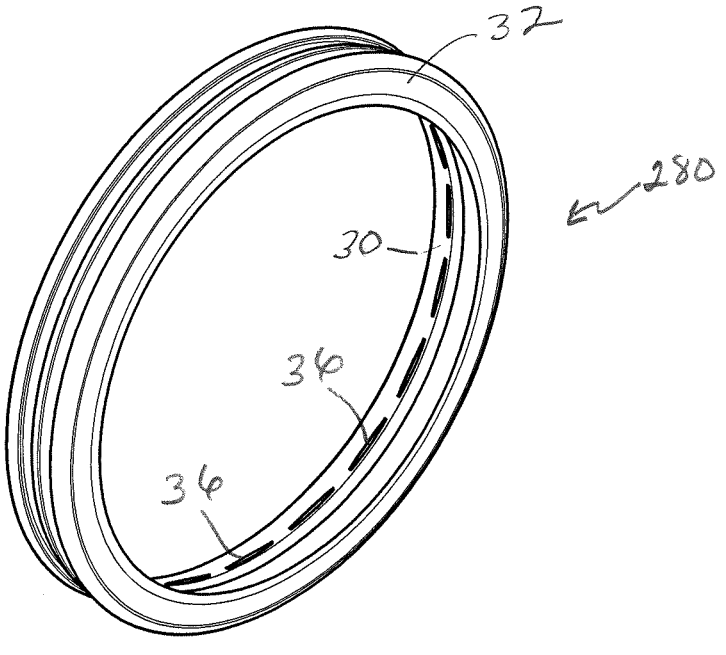
FIG. 14 is a perspective view of the gasket of FIG. 6 showing the placement of locking segments around its periphery.
Figure 15:
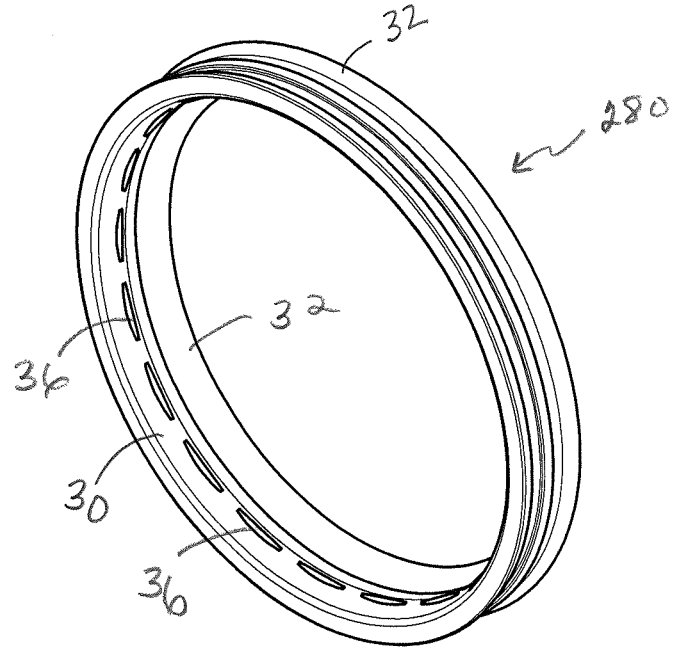
FIG. 15 is another perspective view of the gasket of FIG. 6 showing the placement of locking segments around its periphery.

FIGS. 14-15 show perspective views of gasket 280. As can be seen from FIGS. 14-15, gasket 280 includes a heel portion 30 on one end, and a sealing portion 32 on the other end. In operation, spigot end 12 is inserted through the heel portion 30 side of gasket 280 and advanced until peak radial compression of heel portion 30 is achieved. As spigot end 12 is advanced further, no more axial resistance is attributable to the radial force required to compress heel portion 30 because heel portion 30 is already fully compressed. Rather, the axial force required to continue advancement of spigot end 12 is attributable to overcoming the radial force required to compress sealing portion 32, which is less than the radial force required to compress heel portion 30. In this way, the peak force required to fully assemble the restrained pipe joint 10 is the amount of force needed to overcome the force required to reach peak compression of the heel portion 30 only.

As will be apparent to one skilled in the art, various modifications can be made within the scope of the aforesaid description. Such modifications being within the ability of one skilled in the art form a part of the present invention and are embraced by the claims below.

The invention claimed is:

1. A method of assembling a restrained pipe joint comprising:

providing (i) a first pipe having a spigot including a distal end, a first outer wall section, a second outer wall section extending to and between the distal end and the first outer wall section, and an annular rim formed by an intersection of the first outer wall section and the second outer wall section, wherein the second outer wall section tapers radially inwardly from the annular rim towards the distal end, (ii) a second pipe having a bell end including a gasket receiving groove and a groove inner wall, and (iii) a gasket operatively positioned within the gasket receiving groove, the gasket including a compressible body having a heel portion, a sealing portion and a plurality of rigid segments at least partially embedded in the heel portion, at least one rigid segment of the plurality of rigid segments including a tooth extending radially inward, and inserting the spigot into the bell end, wherein inserting the spigot into the bell end includes, contacting the tooth at a first location on the second outer wall section of the spigot, followed by, sliding the tooth along a length of the second outer wall section defined between the first location and the rim without compressing the sealing portion of the gasket between the spigot and the groove inner wall, wherein the heel portion includes a first annular groove configured for receiving an annular bead formed by the groove inner wall and the compressible body includes a second annular groove separating the heel portion from the sealing portion and defining in part a compressible body neck portion extending between and coupling the heel portion and the sealing portion.

2. The method of claim 1 including progressively increasing a compression force on the heel portion of the gasket as the tooth slides along the length of the second outer wall section between the first location and the rim.

3. The method of claim 2, wherein the compression force reaches a maximum compression force when the tooth engages the rim.

4. The method of claim 3 including reaching the maximum compression force prior to compressing the sealing portion between the spigot and the groove inner wall.

5. The method of claim 2 including sliding the tooth along the first outer wall section and simultaneously compressing the sealing portion of the gasket between the spigot and the groove inner wall, wherein sliding the tooth along the first outer wall section occurs without progressively increasing the compression force on the heel portion of the gasket.

6. The method of claim 1 including sliding the tooth along the first outer wall section and simultaneously compressing the sealing portion of the gasket between the spigot and the groove inner wall.

7. The method of claim 1, wherein the at least one rigid segment has a substantially L-shaped cross-section.

8. The method of claim 1, wherein the sealing portion includes a third annular groove.

9. A method of assembling a sealed, restrained pipe joint comprising:

providing a first pipe having a spigot with a tapered end section, a second pipe having a bell end and a bell end inner wall, and a gasket contained within the bell end, the gasket having a heel portion, a sealing portion and a plurality of rigid segments at least partially embedded in the heel portion, at least one rigid segment of the plurality of rigid segments including a single tooth extending radially inward, and inserting the spigot end into the bell end and through the gasket, wherein inserting the spigot end into the bell end and through the gasket includes, progressively increasing compression of the heel portion of the gasket between the spigot end and the bell end inner wall as the single tooth slides along the tapered end section without compressing the sealing portion between the spigot end and the bell end inner wall, followed by, progressively increasing compression of the sealing portion of the gasket between the spigot end and the bell end inner wall as the sealing portion slides along the tapered end section without progressively increasing compression of the heel portion between the spigot end and the bell end inner wall, wherein the heel portion includes a first annular groove configured for receiving an annular bead formed by the bell end inner wall and the gasket includes a second annular groove separating the heel portion from the sealing portion and defining in part a neck portion extending between and coupling the heel portion and the sealing portion.

10. The method of claim 9, wherein the step of progressively increasing compression of the sealing portion of the gasket between the spigot end and the bell end inner wall as the sealing portion slides along the tapered end section without progressively increasing compression of the heel portion between the spigot end and the bell end inner wall occurs after sliding of the tooth along a section of the spigot end that is not tapered.

11. The method of claim 9, including progressively increasing compression of the heel portion of the gasket between the spigot end and the bell end inner wall to a peak heel portion compression prior to progressively increasing compression of the sealing portion of the gasket between the spigot end and the bell end inner wall.

12. The method of claim 9, wherein the at least one rigid segment has a substantially L-shaped cross-section and the single tooth of the at least one rigid segment extends from an end surface thereof.

13. The method of claim 9, wherein the sealing portion includes a third annular groove.

14. A restrained pipe joint comprising:

a first pipe having a spigot including a distal end, a first outer wall section, a second outer wall section extending to and between the distal end and the first outer wall section and having a first length, an annular rim formed by an intersection of the first outer wall section and the second outer wall section, wherein the second outer wall section tapers radially inwardly from the annular rim to the distal end at a taper angle, a second pipe having a bell end and a bell end inner wall, and a gasket contained within the bell end and including, a first annular groove formed within a heel portion of the gasket, a sealing portion, a plurality of rigid segments at least partially embedded in the heel portion, at least one rigid segment of the plurality of rigid segments including a single tooth extending radially inward through an inner annular surface of the gasket, and a first distance extending along the inner annular surface and to and between the single tooth and the sealing portion, wherein the at least one segment, the first length, the taper angle and the first distance are configured for (i) progressively increasing compression of the heel portion of the gasket between the spigot and the bell end inner wall as the single tooth slides along the second outer wall section during insertion of the spigot into the bell end without compressing the sealing portion between the spigot and the bell end inner wall, and (ii) progressively increasing compression of the sealing portion of the gasket between the spigot and the bell end inner wall as the sealing portion slides along the second outer wall section during insertion of the spigot into the bell end without progressively increasing compression of the heel portion between the spigot and the bell end inner wall, wherein the gasket includes a second annular groove formed between the heel portion and the sealing portion.

15. The joint of claim 14 wherein the second annular groove defines at least in part a neck portion of the gasket that coupled the help portion to the sealing portion.

16. The joint of claim 14, wherein the at least one segment is substantially L-shaped.

17. A restrained pipe joint comprising:

a first pipe having a spigot including a distal end, a first outer wall section, a second outer wall section extending to and between the distal end and the first outer wall section and having a first length, an annular rim formed by an intersection of the first outer wall section and the second outer wall section, wherein the second outer wall section tapers radially inwardly from the annular rim to the distal end at a taper angle, a second pipe having a bell end and a bell end inner wall, and a gasket contained within the bell end and including, a first annular groove formed within a heel portion of the gasket, a sealing portion, a plurality of rigid segments at least partially embedded in the heel portion, at least one rigid segment of the plurality of rigid segments including a single tooth extending radially inward through an inner annular surface of the gasket, and a first distance extending along the inner annular surface and to and between the single tooth and the sealing portion, wherein the at least one segment, the first length, the taper angle and the first distance are configured for (i) progressively increasing compression of the heel portion of the gasket between the spigot and the bell end inner wall as the single tooth slides along the second outer wall section during insertion of the spigot into the bell end without compressing the sealing portion between the spigot and the bell end inner wall, and (ii) progressively increasing compression of the sealing portion of the gasket between the spigot and the bell end inner wall as the sealing portion slides a along the second outer wall section during insertion of the spigot into the bell end without progressively increasing compression of the heel portion between the spigot and the bell end inner wall, wherein the joint further includes a seal formed by the compression of the sealing portion between the spigot and bell end inner wall in the absence of a seal formed by the compression of the heel portion between the spigot and bell end inner wall.

* * * * *